United States Patent [19]
Goto et al.

[11] Patent Number: 5,532,785
[45] Date of Patent: Jul. 2, 1996

[54] CAMERA HAVING MEANS FOR CORRECTING SHUTTER TIME BY MEASURING THE ACTUAL EXPOSURE TIME

[75] Inventors: Tetsuro Goto, Funabashi; Akira Katayama, Koganei; Masanori Hasuda, Yokohama, all of Japan

[73] Assignee: Nikon Corporation, Tokyo, Japan

[21] Appl. No.: 208,471

[22] Filed: Mar. 10, 1994

[30] Foreign Application Priority Data

Mar. 12, 1993 [JP] Japan .................................. 5-052631
Mar. 12, 1993 [JP] Japan .................................. 5-052634

[51] Int. Cl.⁶ ........................................................ G03B 7/08
[52] U.S. Cl. ............................................. 354/430; 354/431
[58] Field of Search ....................... 354/234.1, 246–249, 354/431, 456, 430, 435, 437; 73/5

[56] References Cited

U.S. PATENT DOCUMENTS 4,907,027  3/1990  Kobe et al. .............................. 354/435
5,014,082  5/1991  Farrington ............................... 354/437
5,225,865  7/1993  Shiomi et al. ........................ 354/456 X

*Primary Examiner*—Russell E. Adams
*Assistant Examiner*—J. K. Han
*Attorney, Agent, or Firm*—Oliff & Berridge

[57] ABSTRACT

A shutter operation detection device comprising a light emitting diode and a photo transistor is provided in proximity to the shutter curtains to measure the actual exposure time. The difference between the control exposure time, which is based upon the brightness value of the subject to be photographed and the film sensitivity, and the actual exposure time is determined. The control exposure time for the next session is corrected based upon this difference. The amount of correction for increasing the control exposure time is differentiated from the amount correction for decreasing the control exposure time.

32 Claims, 13 Drawing Sheets

F I G. 3
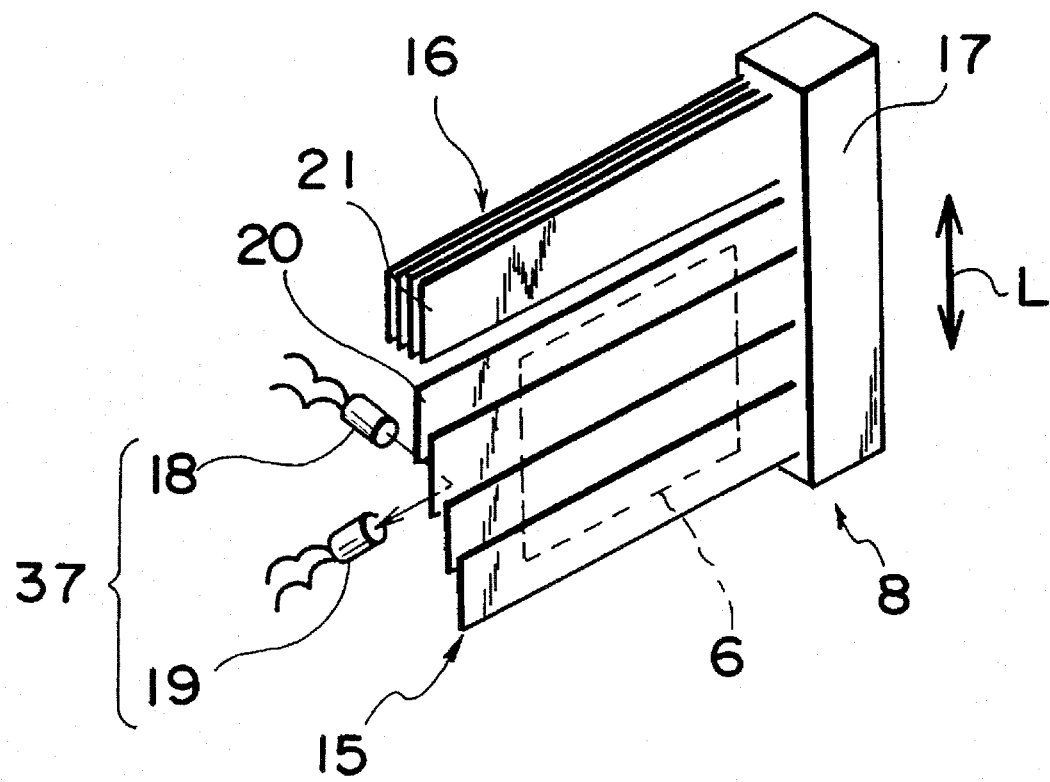

1

CAMERA HAVING MEANS FOR CORRECTING SHUTTER TIME BY MEASURING THE ACTUAL EXPOSURE TIME

BACKGROUND OF THE INVENTION

1. Field of the Invention

The present invention relates to a camera provided with a device that detects the operating state of the shutter.

2. Description of the Related Art

In the known art, in a single lens reflex camera for general use, the light flux from the subject is stopped with the diaphragm of the lens and the exposure time of the film is restricted with a mechanical shutter. The shutter which is used in this type of single lens reflex camera comprises basically two shutter curtains, the so-called front and back curtains. Before exposure, the front curtain covers the opening of the aperture. When the shutter button is pressed, the front curtain first withdraws from the aperture opening to start the exposure of the film surface and when a specific length of time has elapsed, the opening of the aperture is started to operate so that the aperture opening is covered by the rear curtain. The operation of each curtain is mechanically driven by applied spring force. The operation is initiated by cutting off the power supply to an electromagnet that holds each curtain.

In recent years, high speed shutter capability, such as 1/8000 sec. has become an important specification, and at the same time, higher speeds for the synchronized strobe to enable image-making in a bright environment has become a requirement. For these purposes, it is necessary to increase the force of the aforementioned springs, in order to significantly increase the operating speed of the curtains (hereafter referred to as curtain speed), while it is also necessary to implement control to ensure that the width of the slit formed by the front curtain and the back curtain is narrow.

However, with this type of shutter, in which the curtain speed is high and the slit width is narrow, the following problems arise.

Even if the exposure time is controlled by accurately controlling the timing of the power supply to the electromagnets, it is exactly the same as the prior art in that the actual exposure time is entirely dependent upon the state of each curtain, both of which are mechanically operated. The varying factors affecting shutter time (shutter speed) include the speed at which the connecting-holding mechanism is able to be released by cutting off the power supply to the electromagnet, and inconsistencies in the mechanical operating system, including the springs. Also, as they naturally possess variable characteristics subject to thermal conditions and variations with time, unpredictable overall performance changes occur. This phenomenon becomes even more prominent when higher speed of operation is attempted.

Typical errors include, for example, failure to achieve the desired shutter time, resulting in excessive or insufficient exposure of the film surface. In an extreme case, no exposure at all may be achieved because the operation of the two, curtains overlap. Another problem, the reverse, may arise, in which excessive exposure occurs because the curtains do not close. These problems are exacerbated by the fact that none of these phenomena are detected during photographing and so the failure is not discovered until the film is developed.

SUMMARY OF THE INVENTION

The objective of the present invention is to provide a camera in which the operating state of the shutter is detected so that the aforementioned problems can be eliminated.

In order to achieve the objective, the present invention provides a camera provided with a shutter time measuring system, the camera, comprising a means for calculating the exposure time for control, a shutter drive control device that drive-controls the shutter based upon the calculated exposure time, a measuring device that measures the actual exposure time obtained by driving the aforementioned shutter with the drive control device and a means for correction that first calculates the difference between the control exposure time and the actual exposure time and corrects the control exposure time based upon this difference, in which the degree of correction in the direction in which the control exposure time is reduced and the degree of correction in the direction in which the control exposure time is increased, are differentiated.

BRIEF DESCRIPTION OF THE DRAWINGS

FIG. 3 shows an embodiment of the shutter time measuring system according to the present invention;

DESCRIPTION OF THE PREFERRED EMBODIMENTS

First embodiment

Figure 1:
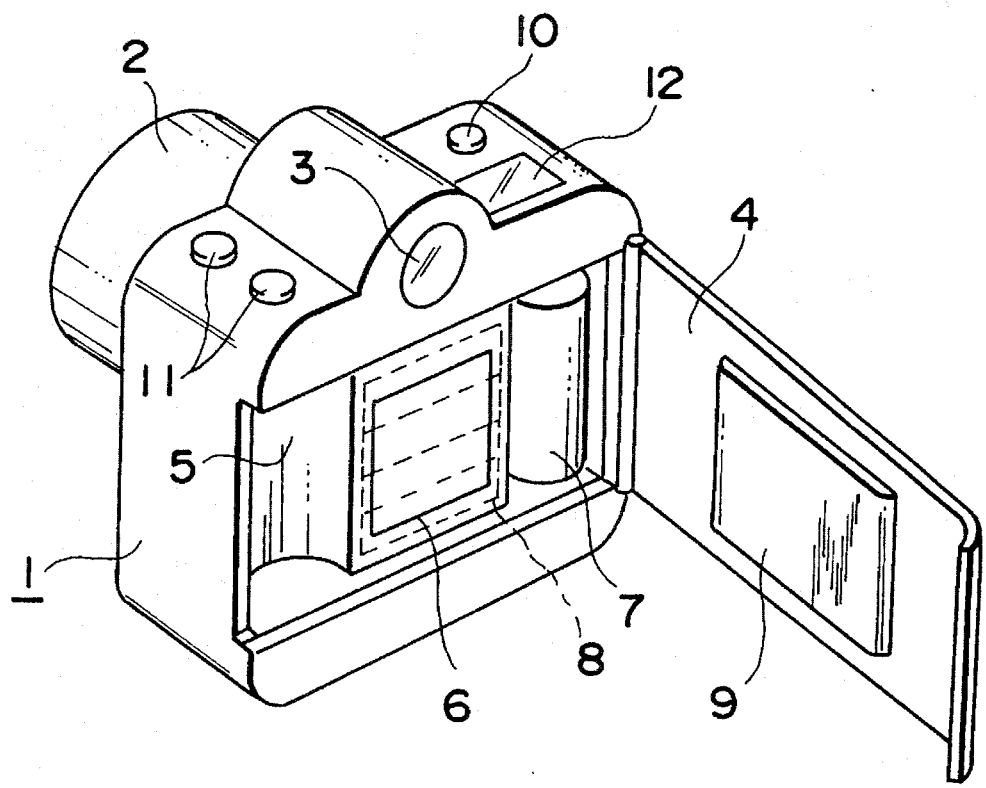
FIG. 1 is an external perspective view of an embodiment of the camera with a shutter time measuring system according to the present invention.

FIG. 1 shows a camera 1 in which the present invention is adopted viewed from behind with the back cover 4 open. A film cartridge (not shown) is loaded in the cartridge chamber 5and the film that is drawn out from the cartridge passes across the front side of the aperture 6 to be wound around the take-up spool 7. The pressure plate 9 provided on the inside of the back cover 4 presses the film (not shown) against the aperture 6 to keep the film flat. The shutter 8 which is provided inside the aperture 6 covers a slightly wider area than the aperture 6 as shown with the broken lines in the figure and when the shutter operates, the light from the subject is directed onto the film surface via the lens 2 for a specific period of time. The photographer visually verifies the state of the subject that has passed through the lens to the viewfinder 3 and by pressing the release button 10, exposure of the film is instructed.

The exposure mode and various other conditions can be verified on the display device 12, which may be a liquid crystal display device (hereafter referred to as the LCD). A plurality of setting buttons 11 are operating controls for arbitrarily setting the operating mode and photographing conditions for the camera 1 and they are operated while checking the display on the LCD 12.

Figure 2:
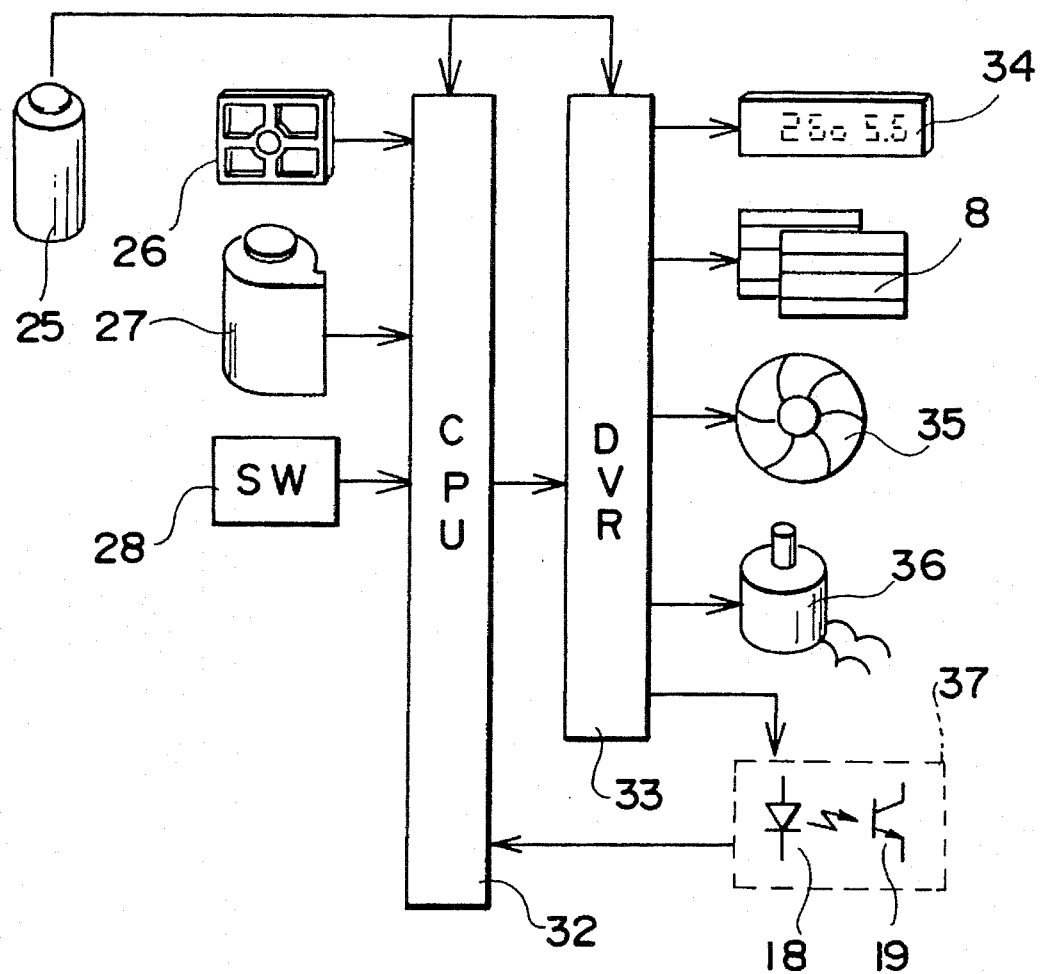
FIG. 2 is a block diagram illustrating an embodiment of the electric circuit of the camera with a shutter time measuring system according to the present invention.
Figure 4:
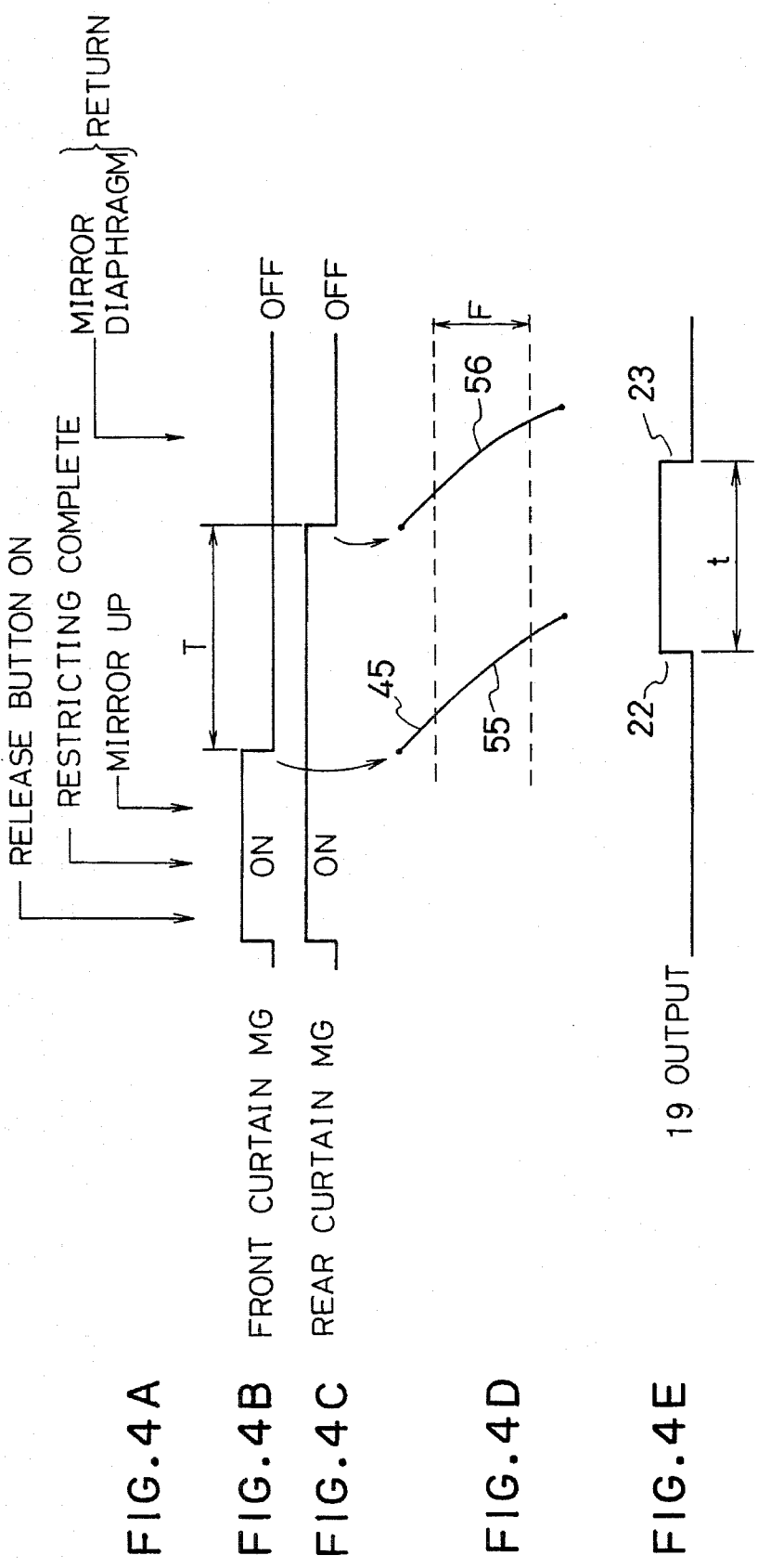
FIGS. 4A–4E are waveform and timing charts of various parts of the shutter time measuring system above.

FIG. 2 shows the electric circuit blocks of an embodiment of the camera 1 according to the present invention.

These circuits have their power source in a battery 25 and central control is performed by the CPU 32. A photometric device 26 meters brightness in a plurality of regions into which the photographic field or subject field is partitioned, and inputs a plurality of measured values to the CPU 32. The film sensitivity detection device 27 reads the code signal given by a code pattern which is added to the side surface or the like of the loaded film cartridge and inputs film sensitivity information to the CPU 32. The switch group 28 includes the aforementioned release button 10, manual operation switches such as switches interlocking with the setting buttons 11 and the timing switch for detecting the sequence state of the camera. From these switches, information on the state of the camera is input to the CPU 32.

The output from the CPU 32 controls the following drive operations via the driver circuit 33.

(1) Drives the LCD 34 to control its display of information related to exposure and the operating mode setting, warning information and the like.

(2) Controls the operating time intervals of the shutter 8, more specifically, the operating time intervals for the magnet of front curtain and the magnet of rear curtain, i.e., the exposure time.

(3) Controls the amount of light entering by driving the diaphragm 35 inside the lens 2.

(4) Controls winding and rewinding feed mechanism for the film and the operation in which force is applied by the aforementioned shutter drive springs by driving the motor 36.

(5) Controls the shutter curtain operation detection device 37. This detection device 37, as described later, consists of a light emitting diode (hereafter referred to as an LED) 18 and a photo-transistor (hereafter referred to as a PTR) 19. The CPU 32 runs the LED 18 and at the same time, receives the signal generated by the PTR 19.

FIG. 3 shows the positional relationship between the shutter 8 and the aperture 6, including the positions of the aforementioned LED 18 and PTR 19. The operation of the shutter 8 is explained in detail in reference to FIG. 3.

This figure shows the state before the release button 10 is pressed, in other words, the state before exposure starts. The aperture 6, indicated with the broken lines, is covered by the front curtain 15. The curtain 15 is structured with a plurality of blades, for example, 4 blade:s, and when it is covering the aperture 6, the blades are extended but still overlap each other slightly, as shown in the figure. Likewise, the rear curtain 16 is structured with a plurality of blades, for example, 4 blades, and in the state shown in FIG. 3, the rear curtain blades are stacked above the aperture 6 in standby state. The blade 20, which is, of the plurality of blades of the front curtain 15, rear-most in the figure, that is, closest to the film, and the blade 21 which is front-most, of the blades of the rear curtain, that is, closest to the photographic subject, together form a slit. The slit is formed when the rear curtain 16 emerges on the inside of the aperture 6 while the front curtain 15 is operating on the inside of the aperture 6 with the control shutter time set at a relatively high speed.

Numeral 17 indicates a section where the aforementioned front curtain magnet, rear curtain magnet, shutter drive spring and the like are housed. Basically, it is provided with mechanisms of the known art (not shown) including the aforementioned two electromagnets for holding the two curtains independently, two sets of springs for operating the two curtains and a linking mechanism for operating the blades vertically parallel to one another.

From the state illustrated in FIG. 3, the exposure operation is performed in the following manner.

First, the front curtain magnet releases the front curtain 15. With this, the front curtain 15 retracts so that it is folded below the aperture 6. Now there is nothing between the light from the subject and the aperture 6, and exposure of the film starts. When a specific period of time has elapsed, the rear curtain magnet releases the rear curtain 16 and the rear curtain 16 travels downward from the position shown in the figure, extending over the aperture 6. The aperture 6 is now covered with the rear curtain 16 and exposure for the duration of the scheduled time is completed. After the exposure is performed in the manner described here, the film is fed forward by one frame and wound up by a winding mechanism (not shown) so that a new unexposed frame of film faces against the aperture 6, and the two curtains 15, 16 are pulled upwards to return to the state before exposure.

As shown in FIG. 3, the detection device 37 comprising the aforementioned LED 18 and the PTR 19 is provided facing opposite the tips of the blades of the front curtain 15 and rear curtain 16 inside the shutter 8. The LED 18 and the PTR 19 are arranged in such a manner that when the light from the LED 18 is reflected by the blades of the front curtain 15 or the blades of the rear curtain 16, it enters the PTR 19. If no blade is present in the outgoing light path from the LED 18, then no light enters the PTR 19. Consequently, by metering the output level of the PTR 19, the time during which reflected light enters the PTR 19, can be measured, and this is equivalent to the actual exposure time.

FIGS. 4A through 4E are timing charts showing the operation of the shutter 8 and the waveform of the signal output from the PTR 19. They show the operating states of the two curtains that change subject to the on/off timing of the magnets (MG) for controlling the curtains and the changes in the detection signals from the PTR 19.

When the release button 10 is pressed, power is supplied to the front curtain and rear curtain magnets to turn them on and the electromagnetic holding of each curtain starts. As in the prior art, the curtains are held mechanically before the release button 10 is pressed, and they are held electromagnetically after the release button 10 is pressed. Then, with a mechanical operation (not shown), diaphragm control in the lens 2 is performed first and then the main reflex mirror within the photographic light path starts to be elevated.

Next, the front curtain magnet is turned off. The range F indicated with the broken lines in FIG. 4D shows the open area in the longitudinal direction (in the direction of the arrow L in FIG. 3) of the aperture 6, and as the front curtain 15 travels it creates a track such as the travel curve 55 in the figure within the aperture area F. Since the blade 20 of the front curtain 15 that forms the slit will have passed the aforementioned detection device 37 at the intermediate position of the traveling curve 55, the output from the PTR 19 is inverted on the timing indicated by 22 in the figure.

After that, when the time T, which is the pre-set exposure time, has elapsed, the rear curtain magnet is turned off and the rear curtain 16 starts operating. It crosses the aperture area F as shown by the travel curve 56. The rear curtain 16 will start passing by the detection device 37 at the intermediate position of the travel curve 56 and the output from the PTR 19 inverts to the original signal level on the timing indicated by 23 in the figure.

The true exposure time (actual exposure time) t can be measured if the inversion timings 22 and 23 of the PTR 19 thus obtained are detected in relation with the timing of the front curtain magnet and the rear curtain magnet going off and the time elapsed from the invert timing 22 to the invert timing 23 is calculated. For example, even when the exposure control circuit correctly meters the scheduled time T and drives the magnets at the correct timing, if the actual exposure time t obtained from the PTR 19 differs from the scheduled time T, we can deduce that there has been an error in the mechanical system.

Figure 5:
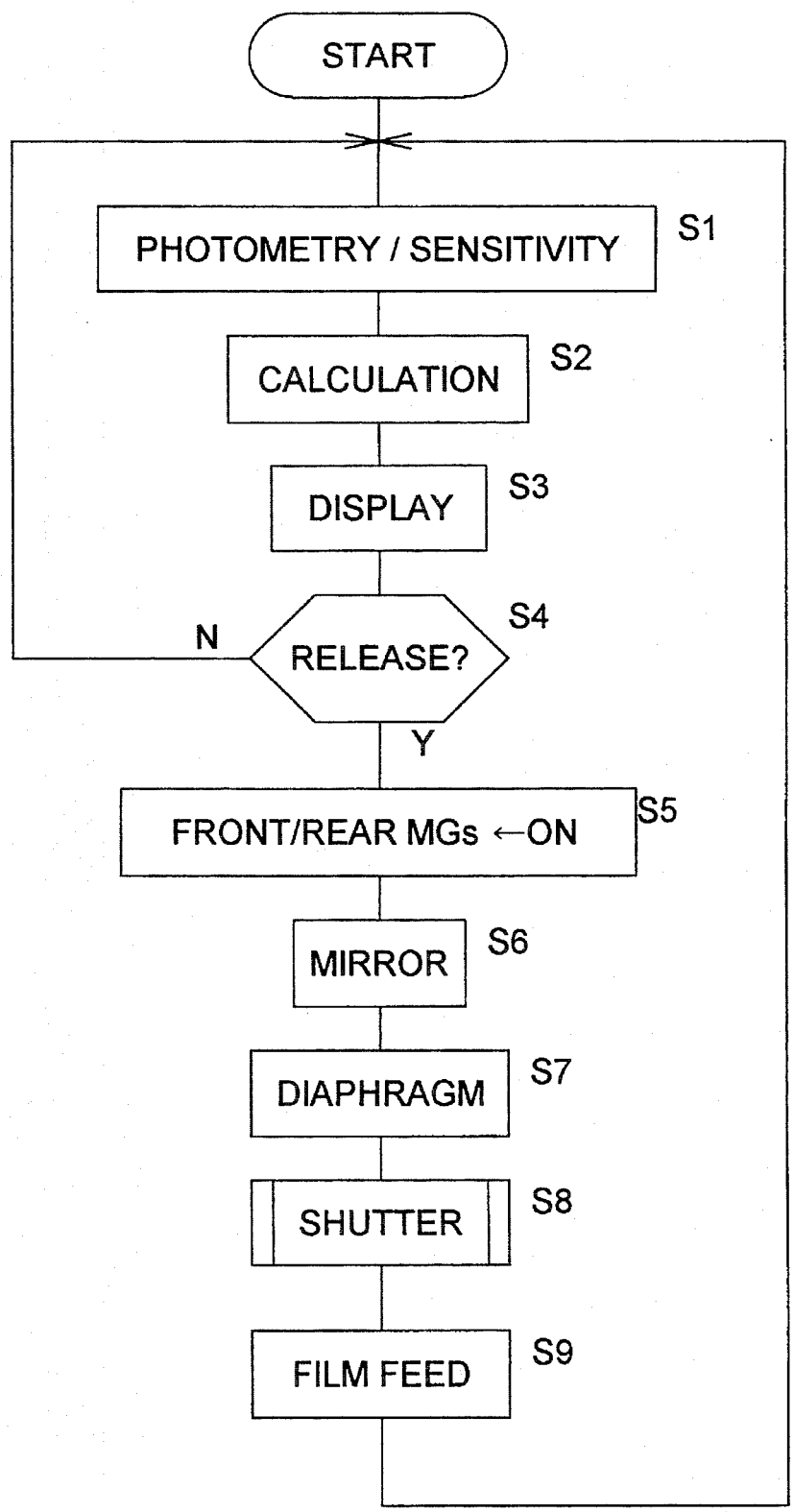
FIG. 5 is a flow chart illustrating an example of the main program in the CPU.

FIG. 5 shows an example of a processing routine performed by the CPU 32 in FIG. 2. This routine is executed repeatedly while power is supplied.

In step S1, the photometric signal from the photometric device 26 and the sensitivity signal from the sensitivity detection device 27 are received and in step S2, the shutter time and the stop number that represent the correct exposure requirements are calculated. In step S3, the exposure requirements thus determined, and the like, are displayed on the LCD 34. In step S4, it is determined whether or not the release button 10 has been pressed by the switch detection group 28. If it is determined that the release button 10 has not been pressed, the operation goes back to step S1 and the above processing is repeated.

In step S5, since it was determined in step 4 that the release button 10 was pressed, the front curtain and rear curtain magnets are turned on. In step S6, the main reflex mirror (not shown) is elevated so that it withdraws from the photographic light path. In step S7, the diaphragm 35 is controlled so that it will obtain a specific stop opening. In step S8, the shutter routine that controls the exposure of the film by opening/closing the shutter 8 and the shutter curtain operating-state detection routine performed by the detection device 37 are executed. The details of this control are described in FIGS. 6 and 7. In step S9, since the exposure operation has been completed, the motor 36 is rotated in the forward direction to feed the film forward and at the same time, various components of the camera are re-set to their initial positions to be charged. With this, the exposure operation has completed one cycle and the operation goes back to step S1 to repeat the aforementioned processing.

Figure 6:
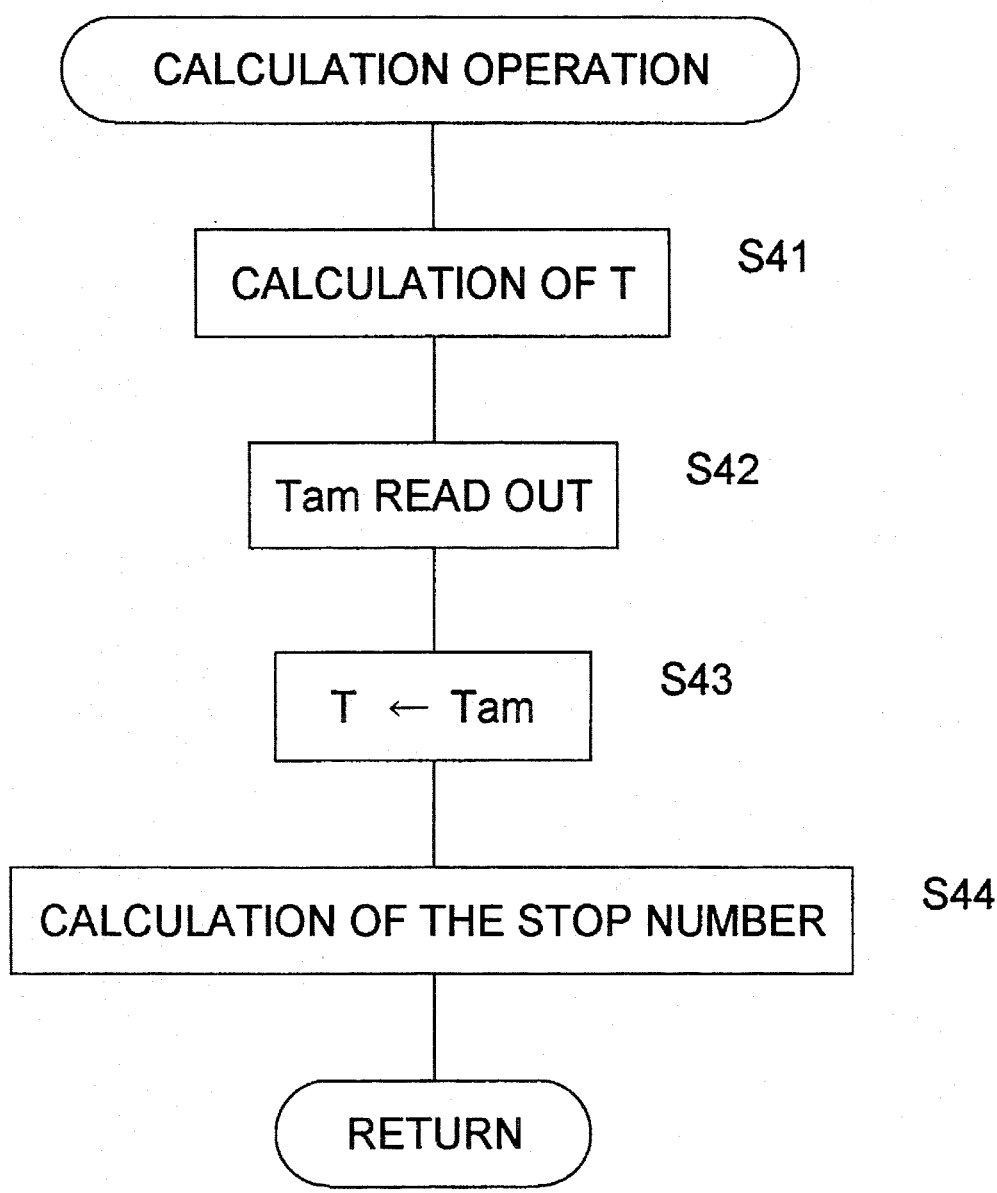
FIG. 6 is a flow chart illustrating an example of a program in the CPU for exposure value calculation.

FIG. 6 shows details of the calculation processing in step S2.

In step S41, the control shutter time T (control exposure time) is calculated, based upon the photometric information and sensitivity information detected in step S1. In step S42, the table in the CPU 31 is referenced based upon the control shutter time T to read out the correction shutter time Tam that has been stored in memory in step S27 in FIG. 7, to be explained later. In this table, the control shutter time T and the correction shutter time Tam are stored in memory in correspondence to each other and the initial value T is equal to Tam. In step S43, the read-out Tam substitutes for T and the subsequent displays and shutter control are performed with the correction shutter time Tam. In step S44, the correct stop number is calculated based upon the control shutter time T, the value of which has been substituted by Tam.

Figure 7:
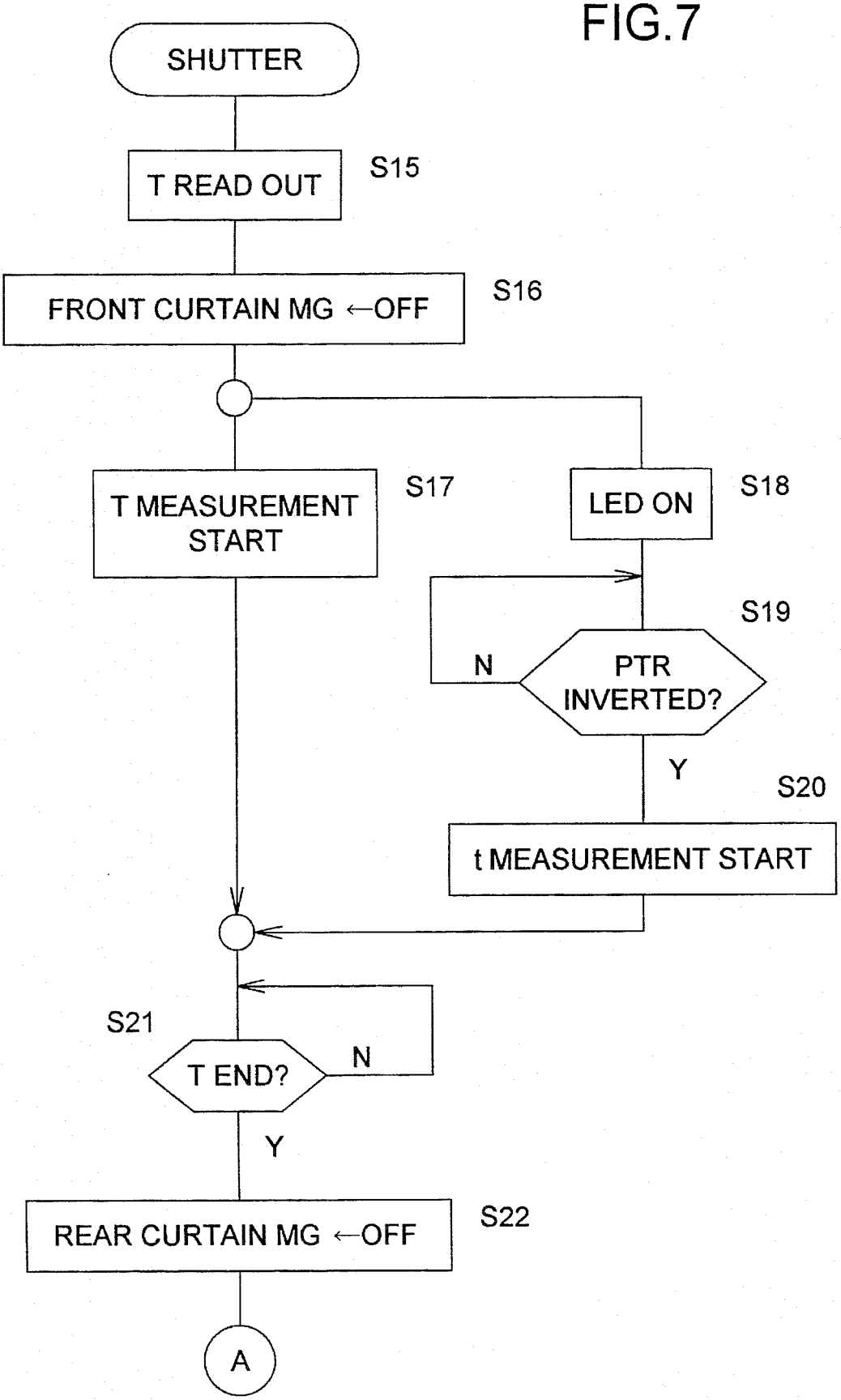
FIG. 7 is a flow chart illustrating an example of a program in the CPU for shutter control.
Figure 8:
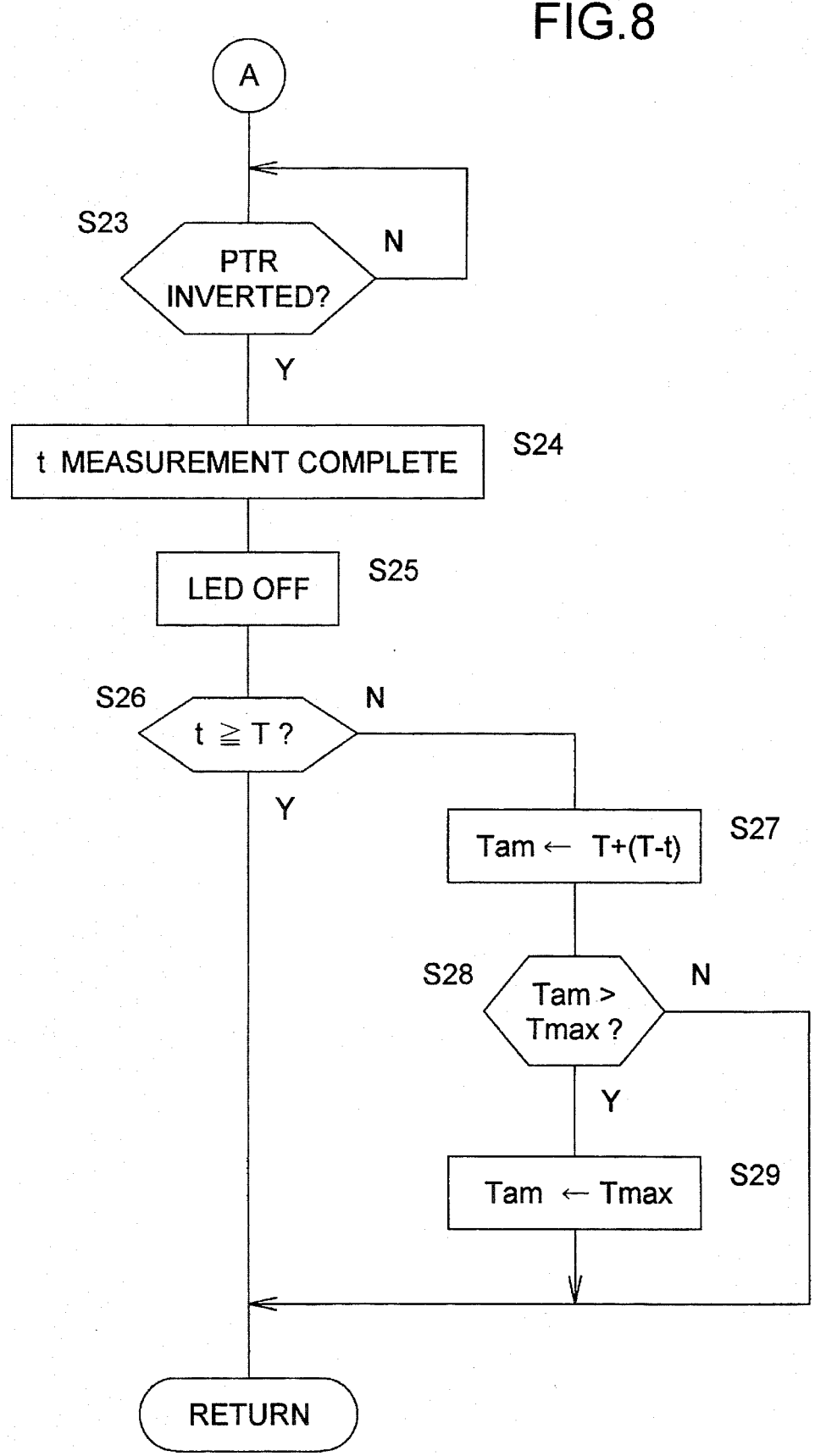
FIG. 8 is a flow chart illustrating an example of a program that succeeds FIG. 7.

FIGS. 7 and 8 show detailed examples of step S8 above.

In step S15, the shutter time for control (control shutter time) T which has been obtained in step S2 is read out. In step S16, power supply to the front curtain magnet is cut off to start the operation of the front curtain 15. After this, the processing in step S17 and the processing that starts in step 18 are executed simultaneously. In step S17, measurement of the control shutter time T that has been read out starts. In step S18, driving of the LED 18 is started at the same time as step 17 and in step S19, inversion of the output from the PTR 19 (first transition) due to the completion of the passing of the front curtain 15 is awaited. The timing with which this event is affirmed is equivalent to the timing 22 shown in FIG. 4 and on the timing with which step S19 is affirmed, measurement of the actual exposure time t starts.

As indicated in the timing charts in FIGS. 4A–4E, an example of the control shutter time T used in this embodiment represents a case in which the control shutter the T is sufficiently longer than the operating time of either curtain to facilitate simple explanation. Under these conditions, the operation can be easily understood, since the completion of measurement of the control shutter time T comes after the start of the measurement of the actual exposure time t.

Note that when the control shutter time T is very short, and the completion of measurement of the control shutter time T comes before the start of measurement of the actual exposure time t, the following processing may be acceptable. The operation awaits the completion of the measurement after measurement of the control shutter time T starts and the LED 18 turns on simultaneously. The measurement of the actual exposure time t is started by applying an interrupt with the inversion of the output (first transition) from the PTR 19 and is completed with the inversion of the output (last transition) from the PTR 19.

In step S21, the completion of measurement of the control shutter time T is awaited. When measurement of the control shutter time T is completed, the power supply to the rear curtain magnet is cut off in step 22 to start the operation of the rear curtain 16. In step S23, the operation waits for the rear curtain 16 to start to travel across the detection device 37 and for the output from the PTR 19 to invert (last transition). With the output from PTR 19 inverted, measurement of the actual exposure time t is completed and the time t is determined in step S24. In step S25, the LED 18 goes off, since the measurement has been completed.

Next, in step S26, a determination is made as to whether the actual exposure time t, as measured, is equal to or greater than the pre-calculated control shutter time T. If not, the operation proceeds to step S27. In other words, if the actual exposure time t is shorter than the control shutter time T, the difference between the actual exposure time t and the control shutter time T is added to the control shutter time T and the result is stored in the table in the CPU 32 as the correction shutter time Tam for that particular control shutter time T in step S27. This correction shutter time Tam is read out by referencing the table based upon the control shutter time T that is calculated the next time photographing is performed.

If it is determined that this correction shutter time Tam is larger than the pre-determined threshold value Tmax in step S28, the correction shutter time Tam is limited to the threshold value Tmax in step S29. If step S28 is negative, the correction shutter time Tam remains unchanged. The threshold value Tmax may be set by referring to specific allowable values that are stipulated in, for example, JIS (Japanese Industrial Standards).

If the actual exposure time t is longer than the control shutter time T, an affirmative decision is made in step S26 and the processing ends without determining a correction shutter time Tam.

Figure 9:
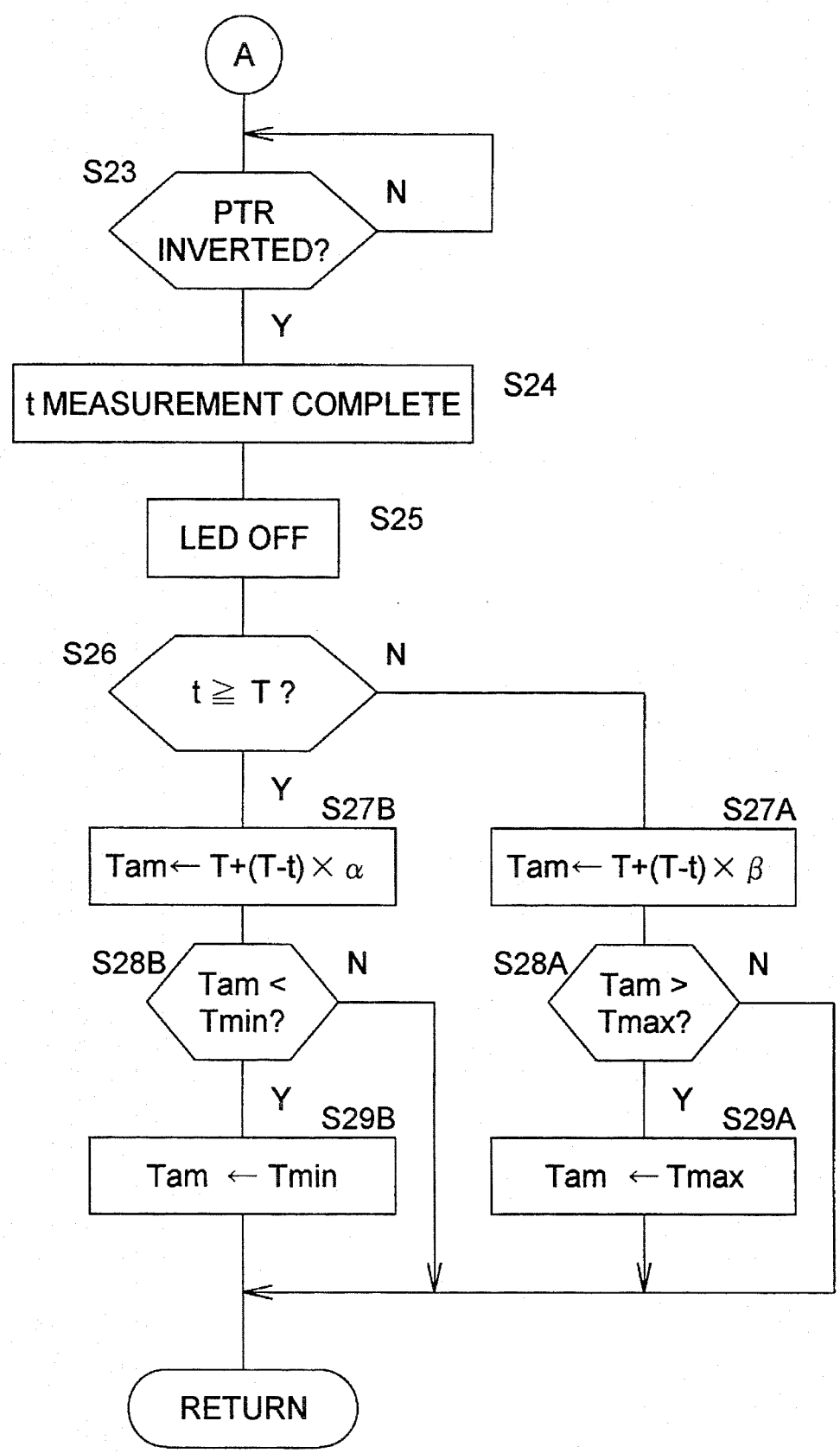
FIG. 9 is a flow chart illustrating another example of the program in FIG. 8.

FIG. 9 shows a variation of the embodiment shown in FIG. 8. Only the differences from the embodiment in FIG. 8 are explained and the same numerals are assigned to identical steps to those shown in FIG. 8.

If it is determined in step S26 that the actual exposure time t is shorter than the control shutter time T, the difference between the actual exposure time t and the control shutter time T is multiplied by the coefficient β (>α) and this value is added to the control shutter time T. The result is assigned as the correction shutter time Tam for that particular control shutter time T in step S27A. The maximum value of the correction shutter time Tam is limited to Tmax just as it is in FIG. 8.

If it is determined that the actual exposure time t is equal to or longer than the control shutter time T in step S26, the difference between the actual exposure time t and the control shutter time T is multiplied by the coefficient and this value is added to the control shutter time T. The result is assigned as the correction shutter time Tam for that particular control shutter time T in step S27B. If it is determined in step S28B that the correction shutter time Tam is shorter than the pre-set threshold value Tmin, the correction shutter time Tam is limited to the threshold value Tmin in step S29B. If step 28B is negative, the correction shutter time Tam remains unchanged. As with Tmax, the threshold value Tmin can be set by referring to the specific allowable values which are stipulated in, for example, JIS.

In the embodiment shown in FIG. 9, the coefficient α is a value smaller than β to make the amount of correction that reduces the control shutter time T somewhat smaller than the amount of correction that increases the control shutter time T. For reference, the embodiment in FIG. 8 represents a case in which the coefficient α is set as an infinite value and the coefficient β is set at 1.

Although in the embodiment described here the correction shutter time is determined with only one measurement, the correction shutter time may be determined based upon the results of a plurality of operations. Also, in the embodiment disclosed above, detection is implemented with electrical control through the detection device 37 structured with a photo-interrupter that is comprised of an LED and a phototransistor. It goes without saying, however, that the detection device may employ other methods, such as a magnetic detection device or a detection device that reads changes in electrostatic capacity. Furthermore, in this embodiment, the correction shutter time is determined by adding the difference between the actual exposure time and the control exposure time and this correction shutter time is used for exposure control when the control exposure time is calculated for subsequent photographing. However, the method of correction need not be limited to this; various methods may be used. For example, a method may be employed in which, if the control shutter time for a subsequent photographic session does not match, or fall into a plurality of shutter times calculated in the previous photographing session the shutter times are proportionally corrected in accordance with the ratio of the control shutter time obtained when the difference was calculated in the previous session and the control shutter time for the current session. Naturally, in this case too, the amount of correction in the direction in which the exposure time is reduced is set at a relatively small value.

Second embodiment

The second embodiment is explained in reference to FIGS. 10–15A and 15B. The same numerals are assigned to parts identical to those in FIGS. 1–9 and, for the most part, only the differences are explained.

Figure 10:
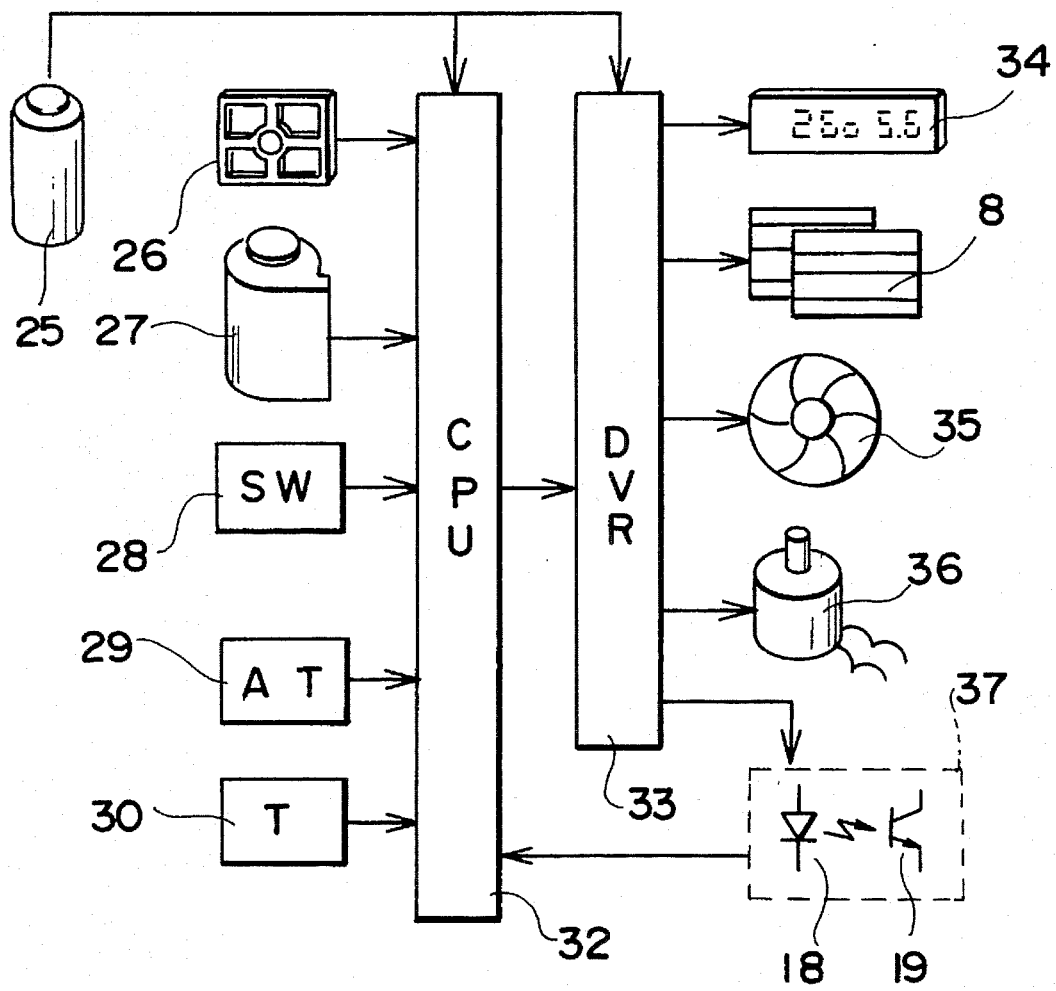
FIG. 10 is an electric circuit block diagram of another embodiment of the camera according to the present invention.

In FIG. 10, number 29 indicates an attitude sensor that detects the way the camera is being held; that is, in the lateral position or longitudinal position, and inputs information accordingly to the CPU 32. Number 30 indicates a thermal sensor that detects the temperature inside the camera, in particular, the temperature in the area where the shutter 8 is exposed and inputs information accordingly to the CPU 32.

Figure 11:
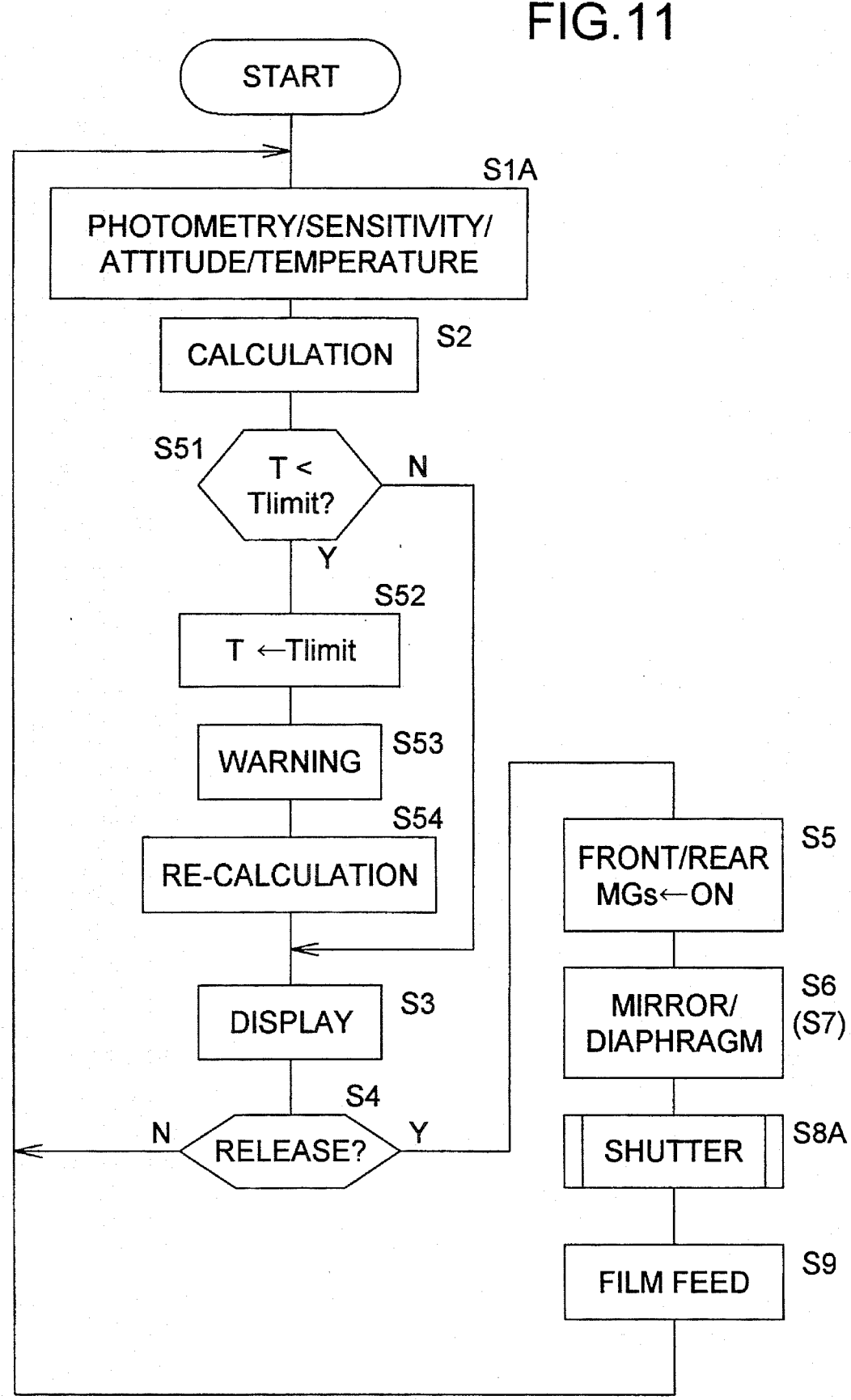
FIG. 11 is a flow chart of an example of the main program in the CPU.

FIG. 11 shows an example of a processing routine performed by the CPU 32 in FIG. 10. This routine is executed repeatedly while power is supplied.

In step S1A, photometric information from the photometric device 26, sensitivity information from the sensitivity detection device 27, attitude information from the attitude sensor 29 and temperature information from the thermal sensor 30 are received and in step S2, a calculation is performed based on the photometric information and sensitivity information to determine the control shutter time T and the stop number that represent the correct exposure requirements. In step S51, the threshold control shutter time Tlimit is read out from the table in the CPU 32 based upon a set of information comprising the attitude information and the thermal information and this value is compared to the control shutter time T. At this point, the threshold control shutter time Tlimit is what has been stored in memory in correspondence to the set of attitude information and thermal information regarding the camera obtained when an operational defect in the shutter was detected. (Refer to step S57 in FIG. 12).

If the control shutter time T calculated in step S2 is shorter than the threshold control shutter time Tlimit, the operation proceeds to step S52, in which the control shutter time T is replaced by the threshold control shutter time Tlimit and a warning is issued in step S53. After that, in step S54, the optimum stop number is calculated based upon the threshold control shutter time Tlimit. The exposure requirements and the like determined in the above process are indicated on the LCD 34 in step S3. If the control shutter time T is shorter than the threshold control shutter time Tlimit, the threshold control shutter time Tlimit and stop number that has been recalculated in step S54 are displayed. If the control shutter time T is longer than the threshold control shutter time Tlimit, the control shutter time and the stop number that were calculated in step S2 are displayed.

In step S4, it is determined whether or not the release button 10 has been pressed by the switch detection group 28. If it has not been pressed, the operation goes back to step S1A and the processing described above is repeated. If the release button 10 has been pressed, the operation proceeds to steps S4–S7 and, as described above, first the front curtain and rear curtain magnets are turned on, the main reflex mirror (not shown) is elevated to move out of the photographic light path and control is performed so that the diaphragm 35 will obtain a specified opening. In step S8A, the shutter routine for controlling the exposure of the film by opening and closing the shutter 8 and the shutter curtain operating-state detection routine performed by the detection device 37 are executed. The details of the control are described in FIGS. 7 and 12. In step S9, since the exposure operation has been completed, the motor 36 is rotated in the forward direction to feed the film and various components in the camera are re-set to their initial positions to be charged. With this, the exposure operation has completed a cycle and the operation goes back to step S1 to repeat the processing described above.

Figure 12:
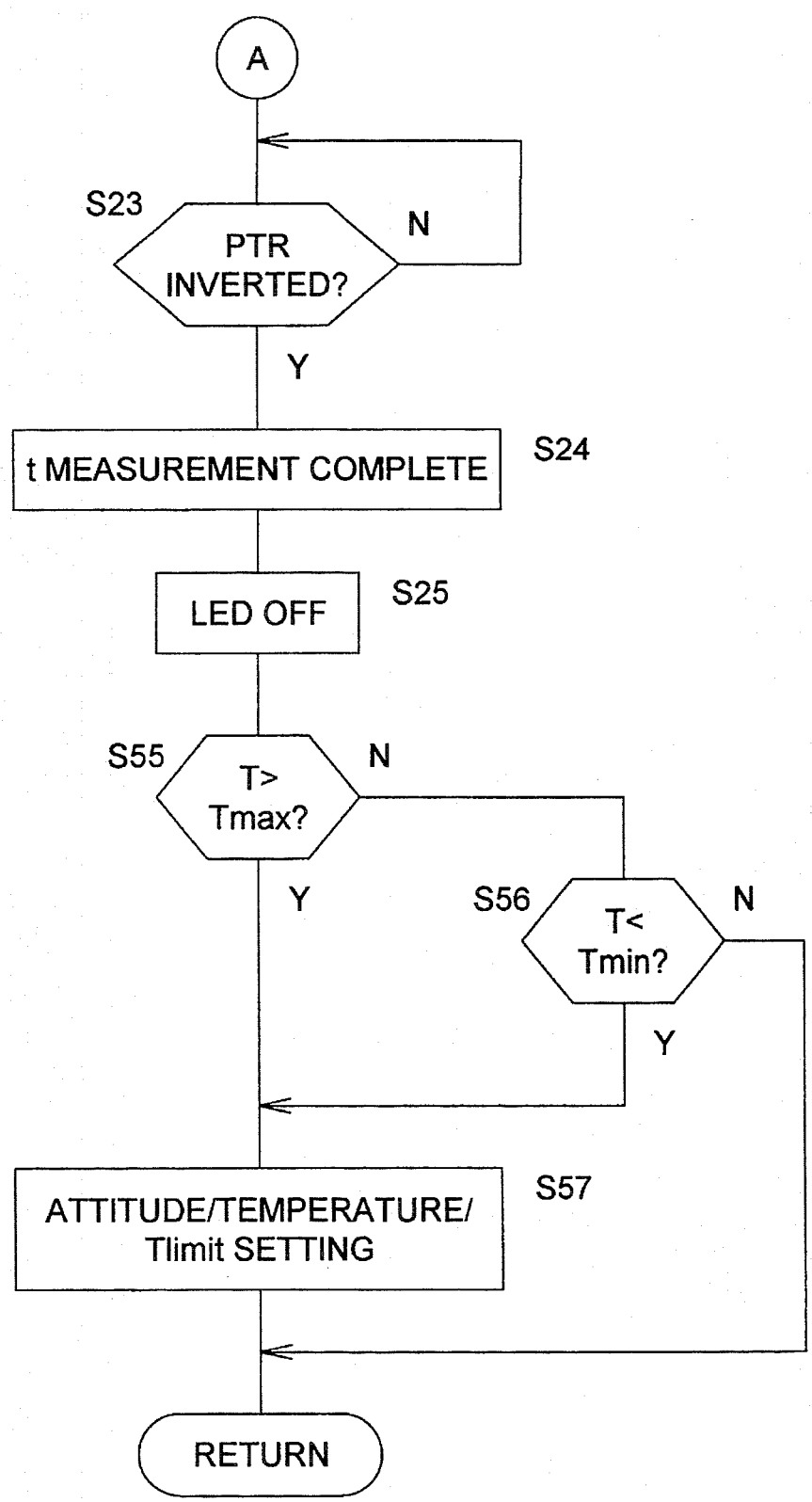
FIG. 12 is a flow chart illustrating an example of a program for shutter control that succeeds FIG. 7.

FIGS. 7 and 12 show detailed examples of the routine in step S8A described above. Note that the embodiment in FIG. 7 is similar to the first embodiment and its detailed explanation is omitted.

After going through steps S15–S20 in FIG. 7, the operation proceeds to step S21 in which the operation awaits completion of the measurement of the control shutter time T. When measurement of the control shutter time T is completed, the operation of the rear curtain 16 is started upon cutting the power supply to the rear curtain magnet in step S22. In step S23, the operation awaits inversion (last transition) of the output from the PTR 19 that occurs when the rear curtain 16 starts to cross the detection device 37. When the output from the PTR 19 has inverted, measurement of the actual exposure time t is completed, the actual exposure time t in step S24 is determined and the LED 18 goes off in step S25 as the measurement has been completed.

Next, in step S55, it is determined whether or not the actual exposure time t exceeds the threshold time Tmax of the control shutter time T. If the actual exposure time t is equal to or less than the control shutter time T, the operation proceeds to step S56, in which it is determined whether or not the actual exposure time t is less than the threshold time Tmin (<Tmax) of the control shutter time T. Only when the actual exposure time t is within the range of the two threshold times Tmax and Tmin of the control shutter time T, step S57 is bypassed and the operation proceeds to step S9 in FIG. 11.

Therefore, the operation proceeds to step S57 when the actual exposure time t is outside the threshold time range Tmax- Tmin of the control shutter time T and it is assumed that the mechanical system of the shutter 8 did not operate correctly for some reason. Therefore, in step S57, a threshold control shutter time Tlimit that is beyond the calculated control shutter time T by, for example, 1/3 step, is set. At this point, this threshold control shutter time Tlimit is stored in memory of the CPU 32 in correspondence with the current set of attitude and temperature information for the camera.

As explained in step S51, the subsequent control, including displays, is executed within a range of shutter times that are equal to or slower than the threshold control shutter time Tlimit. The upper limit time Tmax and the lower limit time Tmin are separately set for each calculated control shutter time and they are supposed to be set within the range of ±1/3 step, centering on the control shutter time.

As has been explained, in the second embodiment, if there has been an error in the measured actual shutter time, after the error, no control in the direction that is faster than the current shutter time will be selected, thus effecting safe control.

For example, with a camera in which the shutter time can be set within the range of 1/8000 sec to 1 sec., if an error is detected in the measured actual time when 1/4000 sec. was set by control, then shutter time settings within the range of 1/4000 to 1/8000 sec. will not be selected in subsequent sessions and control will be executed only within a range of shutter time settings that does not include 1/4000 sec., i.e., a shutter time setting of 1/3200 sec. for example, that is slower by 1/3 step, or a setting lower yet.

As has been described, the threshold control shutter time Tlimit is selected based on a set of an attitude and temperature of a camera, both of which have an effect on a shutter movement characteristic of a camera. When a picture is taken by a camera being held in the lateral position ( the ordinary attitude ) as shown in FIG. 1, the travelling speed of a focal plane shutter is subject to be accelerated by the gravity, because the traveling direction of the shutter is the same as gravity direction. Besides, the shutter device including a front curtain, a rear curtain, a linkage thereof and etc., has various plays which cause the shutter movement characteristic to be varied in accordance with various attitudes of the camera. When a camera is assembled, the shutter device is generally adjusted at the lateral position as a standard position so that an actual shutter time becomes equal to a control shutter time.

However, when a picture is taken by a camera in the longitudinal position, the travelling speed of the shutter becomes different from what was adjusted, so no appropriate shutter time may be established. Because, in the lateral position of the camera, both gravity and a shutter travelling directions are the same, while in the longitudinal position of the camera, both directions are different from each other. Accordingly, the shutter travelling characteristic depends on each of the lateral and longitudinal positions.

Also, there has been a known fact that the travelling characteristic of the shutter depends on temperature. The actual exposure time is different at given temperature even though the shutter is driven with the same control shutter time. Therefore, if Tlimit is set to a certain value which is determined at the standard temperature, there occurs a problem in which no appropriate exposure time can be given, if a picture is taken not at the standard temperature.

With the second embodiment, the above-noted problem is cured, because Tlimit is determined based on a set of attitude and temperature when photographing so that an appropriate exposure can be given. Of course, as mentioned above, Tlimit may be determined based on either attitude or temperature of the camera.

Figure 13:
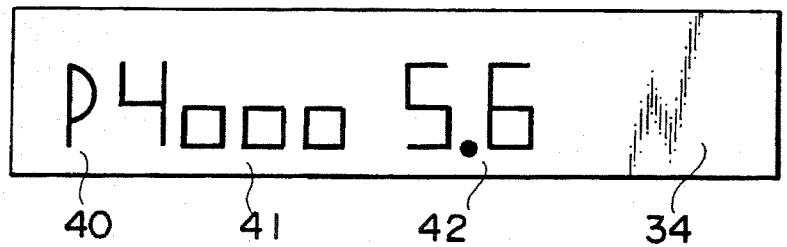
FIG. 13 shows an example display on the LCD 34.

FIG. 13 shows an example of display segments on the LCD 34 when the shutter time is normal.

The segment 40 indicates that the selected mode is program mode and the segments 41 and 42 indicate that the shutter time and the stop number calculated in step S2 are 1/4000 and 5.6 respectively. The case represented in this figure shows that step S51 was negative based upon the results of past measurements, and the shutter time and the stop number calculated in step S2 are adopted without any change and the alarm display is not on.

Figure 14:
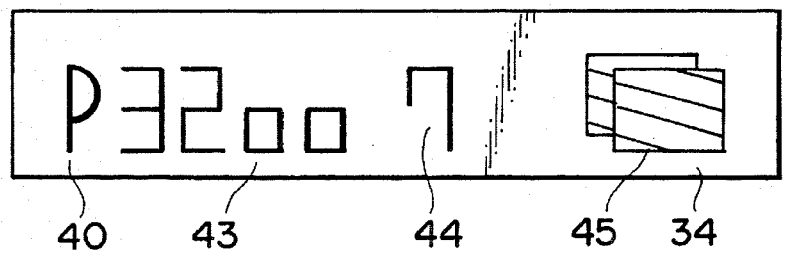
FIG. 14 shows another example display on the LCD 34.

FIG. 14 shows an example of a display after the camera 1 has been operated in the state shown in FIG. 13 and an error has been discovered in the results of measurement at that time through the process illustrated in FIG. 12. Since the shutter time setting 1/4000, selected in FIG. 13, cannot be used, the shutter time setting 1/3200, which is longer than the selected one by 1/3 step and is, therefore, safe, is selected and displayed, as in segment 43 in step S52. Also, the stop number that has been recalculated in step S54 is displayed in segment 44. Furthermore, in step S53, the warning, notifying that the shutter time and stop numbers selected are not the original ones, is issued in segment 45.

Figure 15A:
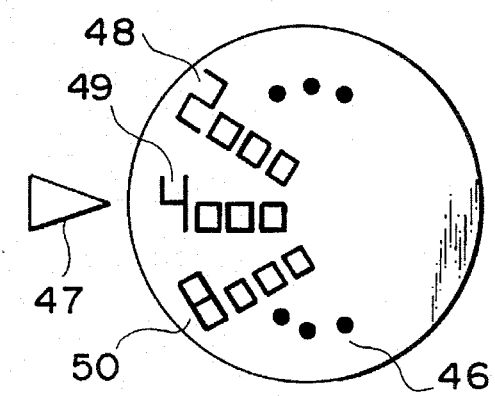
FIGS. 15A and 15B show the manual dial and another example display on LCD 34.
Figure 15B:
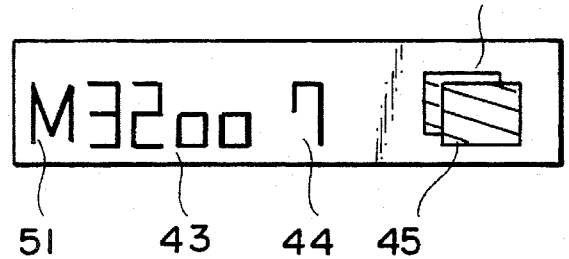

FIGS. 15A and 15B show an embodiment which adopts the present invention in a camera in which the shutter time can be freely set by manually operating a dial.

Number 46 indicates a shutter dial with which a desired shutter time may be set manually. The shutter dial 46 is turned and the printed shutter time that is desired, is aligned to the index 47 to set the shutter time. In the figure, 1/4000 sec. indicated by the numeral 49 is selected. On both sides of the numeral 49 are numerals 48 and 50, indicating the 1/2000 sec. and 1/8000 sec. settings respectively printed on the dial. Even when the 1/4000 sec. setting is selected with the shutter dial 46, if it is determined in step S51 that there was a problem previously, control cannot be implemented at 1/4000 sec., and segment 45 is displayed on the LCD 34 to issue the warning.

To be more precise, if it is determined that the actual exposure time is not within a range of shutter time settings that are ±1/3 step from the control exposure time set with the dial 46, the threshold control shutter time Tlimit is determined, based upon the attitude and temperature of the camera. If the control shutter time T is faster than the threshold control shutter time Tlimit, re-setting is performed by replacing the control shutter time that has been set with the dial 46 with Tlimit and this is displayed on the LCD 34. In the example above, 1/3200 sec. is displayed in segment 45 as shown in FIG. 15B. The recalculated number using Tlimit is set for the stop number. After that, when the release button is pressed, photographing is conducted at the re-set shutter time and stop number. Number 51 in FIG. 15B indicates the segment that displays M, indicating manual mode or P, indicating program mode.

If the control shutter time T is faster than the threshold control shutter time Tlimit, photographing may be not allowed and the optimum shutter time may only be displayed.

In the embodiment described above, the warning decision is executed only with one measurement. However, the warning decision may be made based upon the results of a plurality of operations. Also, in this embodiment, the shutter time, which is determined to be erroneous in steps S55 and S56, is substituted with a shutter time that is longer by 1/3 step for subsequent control. However, the invention is not limited to 1/3 step increments. Also, although in this embodiment, the threshold control shutter time Tlimit is determined for the shutter time determined to be erroneous based upon the attitude and temperature of the camera, Tlimit may be determined only with the attitude or the temperature.

We claim:

1. A camera with a shutter time measuring system, comprising:

calculating means for calculating a control exposure time to be controlled;

a shutter drive control device that drive-controls the shutter for a calculated exposure time;

a measuring device that measuring device that measures the actual exposure time achieved by drive-controlling said shutter with said drive control means; and correction means for calculating the difference between said control exposure time and said actual exposure time and correcting said control exposure time based upon said difference, wherein the amount of correction applied in a direction in which said control exposure time is reduced is smaller than the amount of correction in a direction in which said control exposure time is increased.

2. The camera with a shutter time measuring system according to claim 1, wherein said means for correction includes a determination means for determining whether a calculated control exposure time after correction is within a pre-set range as defined by an upper time limit and a lower time limit, and further comprising restriction means for limiting said calculated control exposure time after correction with either said upper time limit or said lower time limit in the event that said determination of said determination means is negative.

3. The camera with a shutter time measuring system according to claim 2 wherein:

said control exposure time after correction is limited with said upper time limit when said actual exposure time is shorter than said control exposure time and said control exposure time after correction is limited with said lower time limit when said actual exposure time is longer than said control exposure time.

4. The camera with a shutter time measuring system according to claim 1 wherein:

said shutter is provided with a front curtain comprising a plurality of blades that extend to cover an opening for exposure before exposure and that contract as exposure starts, withdrawing from said opening for exposure, and a rear curtain comprising a plurality of blades that are contracted before exposure in a position that does not block said opening for exposure and that extend, after said front curtain starts operating, to cover said opening for exposure to end exposure.

5. The camera with a shutter time measuring system according to claim 4 wherein:

said measuring system includes a detection device that detects when a slit-side blade of said front curtain and a slit-side blade of said rear curtain, which form a slit between said front curtain and said rear curtain, pass a specific position, and a measurement means for measuring the time period that begins when said slit-side blade of said front curtain is detected by said detection device and ends when said slit-side blade of said rear curtain is detected by said detection means.

6. The camera with a shutter time measuring system according to claim 5 wherein:

said detection device includes an illuminator that projects a detection light on said front curtain or said rear curtain, and a light receiver that receives reflected light from said front curtain or said rear curtain.

7. A camera with a shutter time measuring system, comprising:

calculating means for calculating a control exposure time to be controlled;

a shutter drive control device that drive-controls the shutter for a calculated exposure time;

a measuring device that measures the actual exposure time achieved by drive-controlling said shutter with said drive control means, and correction means for calculating the difference between said control exposure time and said actual exposure time and correcting said control exposure time based upon said difference only in a direction in which said control exposure time is increased.

8. A camera provided with a shutter time measuring system, comprising:

calculating means for calculating a control exposure time to be controlled;

a shutter drive control device that drive-controls said shutter for a calculated exposure time obtained by said calculating means;

a measuring device that measures the actual exposure time achieved by drive-controlling said shutter with said drive control means;

determination means for determining whether said actual exposure time is within a pre-set range of an exposure time, and prohibition means for prohibiting shutter operation for all control exposure time settings that exceed said control exposure time that has been determined to be outside said pre-set range of the exposure time if said actual exposure time is determined to be outside said pre-set range of the exposure time by said determination means.

9. The camera with a shutter time measuring system according to claim 8, said camera further comprising a range calculating means for calculating said pre-set range of the exposure time when said actual exposure time is outside the range between a specific upper time limit and lower time limit.

10. The camera with a shutter time measuring system according to claim 9 wherein:

if said actual exposure time is outside said range defined by said specific upper time limit and said lower time limit when said shutter is driven at a given calculated control exposure time, said range calculating means performs calculation with an exposure time setting that is slower than said control exposure time at that point by a specific length of time as said pre-set range of the exposure time.

11. The camera with a shutter time measuring system according to claim 9, said camera further comprising an attitude detection device that detects the attitude of said camera, wherein:

said pre-set range calculation means calculates said range of the exposure time based upon said attitude of said camera as detected by said attitude detection device.

12. The camera with a shutter time measuring system according to claim 9, said camera further comprising a temperature detection device that detects the temperature of said camera, wherein:

said pre-set range calculation means calculates said range of normal operation based upon said temperature of said camera as detected by said temperature detection device.

13. The camera with a shutter time measuring system according to claim 9, said camera further comprising an attitude detection device that detects the attitude of said camera and a temperature detection device that detects the temperature of said camera, wherein:

said per-set means for range calculation calculates said range of the exposure time based upon said attitude of said camera as detected by said attitude detection device and said temperature of said camera as detected by said temperature detection device.

14. The camera with a shutter time measuring system according to claim 8 wherein:

said means for prohibition includes a re-setting means for setting a new control exposure time slower than a control exposure time that has been determined to be outside said pre-set range of the exposure time and said shutter drive control device drive-controls said shutter at said newly set control exposure time.

15. The camera with a shutter time measuring system according to claim 14, said camera further comprising a recalculation means for recalculating the stop number based upon said control exposure time set by said re-setting means.

16. The camera with a shutter time measuring system according to claim 14 wherein:

said control exposure time set by said re-setting means is the exposure time that defines said pre-set range of the exposure time.

17. The camera with a shutter time measuring system according to claim 8 wherein:

said shutter is provided with a front curtain comprising a plurality of blades that extend to cover an opening for exposure before exposure and which contract as exposure starts to withdraw from said opening for exposure, and a rear curtain comprising a plurality of blades that are contracted before exposure in a position that does not block said opening for exposure and which extend, after said front curtain starts operating, to cover said opening for exposure to end exposure.

18. The camera with a shutter time measuring system according to claim 17 wherein:

said measuring system includes a detection device that detects when a front curtain slit-side blade and a rear curtain slit-side blade, which form a slit between said front curtain and said rear curtain, pass a specific position, and a measuring means for measuring the time period that begins when said front curtain slit-side blade is detected by said detection device and ends when said rear curtain slit-side blade is detected by said detection device.

19. The camera with a shutter time measuring system according to claim 18 wherein:

said detection device includes an illuminator that projects a detection light on said front curtain or said rear curtain, and a light receiver that receives reflected light from said front curtain or said rear curtain.

20. A camera provided with a shutter time measuring system, comprising:

an operational member by which a control exposure time to be controlled is manually inputted, a setting means for setting the control exposure time inputted by said operational member, a shutter drive control device that drive-controls said shutter for a set exposure time obtained by said setting means, a measuring device that measures the actual exposure time achieved by drive-controlling said shutter with said drive control means, and a determination means for determining whether or not said actual exposure time is within a pre-set range of an exposure time, and a prohibition means for prohibiting shutter operation for all control exposure time settings higher than said control exposure time that has been determined to be outside said pre-set range of the exposure time if said actual exposure time is determined to be outside said pre-set range of the exposure time by said determination means.

21. The camera with a shutter time measuring system according to claim 20 wherein:

said means for prohibition includes a re-setting means for setting a new control exposure time slower than a control exposure time that has been determined to be outside said pre-set range of the exposure time and said shutter drive control device drive-controls said shutter at said newly set control exposure time.

22. The camera with a shutter time measuring system according to claim 21, further comprising a display that displays the control exposure time set by said setting mean.

23. The camera with a shutter time measuring system according to claim 21, said camera further comprising a recalculation means for recalculating the stop number based upon said control exposure time set by said re-setting means.

24. The camera with a shutter time measuring system according to claim 23, wherein:

said control exposure time set by said re-setting means is the exposure time that defines said pre-set range of the exposure time.

25. The camera with a shutter time measuring system according to claim 20, said camera further comprising a range calculating means for calculating said pre-set range of the exposure time operation when said actual exposure time is outside the range between a specific upper time limit and lower time limit.

26. The camera with a shutter time measuring system according to claim 25, wherein:

if said actual exposure time is outside said range defined by said specific upper time limit and said lower time limit when said shutter is driven at a given calculated control exposure time, said range calculating means performs calculation with an exposure time setting that is slower than said control exposure time at that point by a specific length of time as said per-set range of the exposure time.

27. The camera with a shutter time measuring system according to claim 20, said camera further comprising an attitude detection device that detects the attitude of said camera, wherein:

said pre-set range calculating means calculates said range of the exposure time based upon said attitude of said camera as detected by said attitude detection device.

28. The camera with a shutter time measuring system according to claim 20, said camera further comprising a temperature detection device that detects the temperature of said camera, wherein:

said pre-set range calculating means calculates said range of the exposure time based upon said temperature of said camera as detected by said temperature detection device.

29. The camera with a shutter time measuring system according to claim 20, said camera further comprising an attitude detection device that detects the attitude of said camera and a temperature detection device that detects the temperature of said camera, wherein:

said pre-set means for range calculation calculates said range of the exposure time based upon said attitude of said camera as detected by said attitude detection device and said temperature of said camera as detected by said temperature detection device.

30. The camera with a shutter time measuring system according to claim 20, wherein:

said shutter is provided with a front curtain comprising a plurality of blades that extend to cover an opening for exposure before exposure and which contract as exposure starts to withdraw from said opening for exposure, and a rear curtain comprising a plurality of blades that are contracted before exposure in a position that does not block said opening for exposure and which extend, after said front curtain starts operating, to cover said opening for exposure to end exposure.

31. The camera with a shutter time measuring system according to claim 30, wherein:

said measuring system includes a detection device that detects when a front curtain slit-side blade and a rear curtain slit-side blade, which form a slit between said front curtain and said rear curtain, pass a specific position, and a measuring means for measuring the time period that begins when said front curtain slit-side blade is detected by said detection device and ends when said rear curtain slit-side blade is detected by said detection device.

32. The camera with a shutter time measuring system according to claim 31, wherein:

said detection device includes an illuminator that projects a detection light on said front curtain or said rear curtain, and a light receiver that receives reflected light from said front curtain or said rear curtain.

* * * * *